(12) United States Patent
Monty

(10) Patent No.: US 7,577,177 B2
(45) Date of Patent: Aug. 18, 2009

(54) MULTI-PATH LASER SYSTEM

(75) Inventor: Nathan Paul Monty, Charlton, MA (US)

(73) Assignee: Videojet Technologies Inc., Wood Dale, IL (US)

( * ) Notice: Subject to any disclaimer, the term of this patent is extended or adjusted under 35 U.S.C. 154(b) by 0 days.

(21) Appl. No.: 11/033,495

(22) Filed: Jan. 12, 2005

(65) Prior Publication Data

US 2005/0152425 A1    Jul. 14, 2005

Related U.S. Application Data

(60) Provisional application No. 60/535,549, filed on Jan. 12, 2004, provisional application No. 60/541,912, filed on Feb. 6, 2004, provisional application No. 60/544,198, filed on Feb. 13, 2004, provisional application No. 60/605,157, filed on Aug. 30, 2004.

(51) Int. Cl.
*H01S 3/03* (2006.01)
*H01S 3/22* (2006.01)
*H01S 3/223* (2006.01)
*H01S 3/14* (2006.01)
*H01S 3/097* (2006.01)
*H01S 3/08* (2006.01)
*H01S 3/081* (2006.01)
*H01S 3/082* (2006.01)
*H01S 3/00* (2006.01)

(52) U.S. Cl. .................. 372/61; 372/57; 372/64; 372/68; 372/81; 372/87; 372/92; 372/93; 372/97; 372/98; 372/99; 372/109

(58) Field of Classification Search .......... 372/55, 372/61, 62, 64, 68, 81, 87, 92, 93, 97, 98, 372/99, 109
See application file for complete search history.

(56) References Cited

U.S. PATENT DOCUMENTS

| | | | | |
|---|---|---|---|---|
| 3,657,600 A | * | 4/1972 | Wiegand, Jr. | 361/230 |
| 3,763,442 A | | 10/1973 | McMahan | |
| 3,919,665 A | * | 11/1975 | Schmidt | 372/99 |
| 4,414,488 A | * | 11/1983 | Hoffmann et al. | 315/39 |
| 4,500,996 A | * | 2/1985 | Sasnett et al. | 372/19 |
| 4,507,788 A | | 3/1985 | Barnie et al. | |
| 4,618,961 A | | 10/1986 | Sutter, Jr. | |
| 4,677,638 A | * | 6/1987 | Beaupere et al. | 372/87 |
| 4,750,186 A | | 6/1988 | Steffen | |

(Continued)

FOREIGN PATENT DOCUMENTS

DE    37 22 256    1/1989

(Continued)

OTHER PUBLICATIONS

U.S. Statutory Invention Registration No. H882 issued Jan. 1, 1991.
Supplementary European Search Report dated May 15, 2008.

*Primary Examiner*—Kenneth A Parker
*Assistant Examiner*—Hrayr A Sayadian
(74) *Attorney, Agent, or Firm*—Joseph A. Yosick

(57) ABSTRACT

A laser chamber is provided that increases power, initiation, and discharge efficiency over single chamber lasers by providing a multi-fold laser chamber, protrusions, discharge segmentation and inversion techniques.

18 Claims, 5 Drawing Sheets

U.S. PATENT DOCUMENTS

| | | | |
|---|---|---|---|
| 4,757,511 A * | 7/1988 | Klingel et al. | 372/58 |
| 4,922,504 A * | 5/1990 | Teva | 372/87 |
| 4,939,738 A * | 7/1990 | Opower | 372/95 |
| 5,095,490 A | 3/1992 | Sutter, Jr. | |
| 5,097,472 A * | 3/1992 | Chenausky | 372/38.04 |
| 5,353,297 A * | 10/1994 | Koop et al. | 372/64 |
| 5,481,556 A | 1/1996 | Daikuzono | |
| 6,192,061 B1 * | 2/2001 | Hart et al. | 372/87 |
| 6,539,045 B1 * | 3/2003 | Von Borstel et al. | 372/81 |
| 6,560,014 B1 * | 5/2003 | Trzecieski et al. | 359/484 |
| 6,788,722 B1 * | 9/2004 | Kennedy et al. | 372/64 |
| 2004/0010912 A1 | 1/2004 | Jean | |
| 2004/0218650 A1 | 11/2004 | Monty | |
| 2005/0094697 A1 * | 5/2005 | Armier et al. | 372/55 |
| 2005/0163183 A1 * | 7/2005 | Shackleton et al. | 372/55 |
| 2006/0045150 A1 * | 3/2006 | Newman et al. | 372/25 |

FOREIGN PATENT DOCUMENTS

| | | |
|---|---|---|
| DE | 42 29 138 | 3/1994 |
| GB | 2 253 515 | 9/1992 |
| JP | 01 152790 | 6/1989 |
| JP | 03 036774 | 2/1991 |
| JP | 03119773 A * | 5/1991 |
| JP | 06 268285 | 9/1994 |
| JP | 08 008493 | 1/1996 |
| JP | 2002-329928 | 11/2002 |
| TW | 535 489 | 6/2003 |
| WO | WO 2004 068655 | 8/2004 |

* cited by examiner

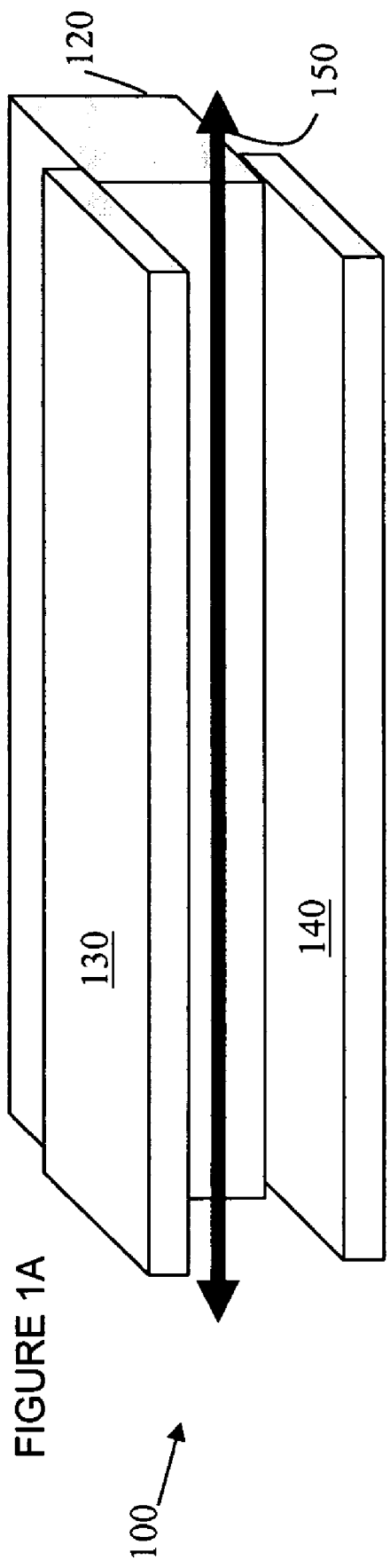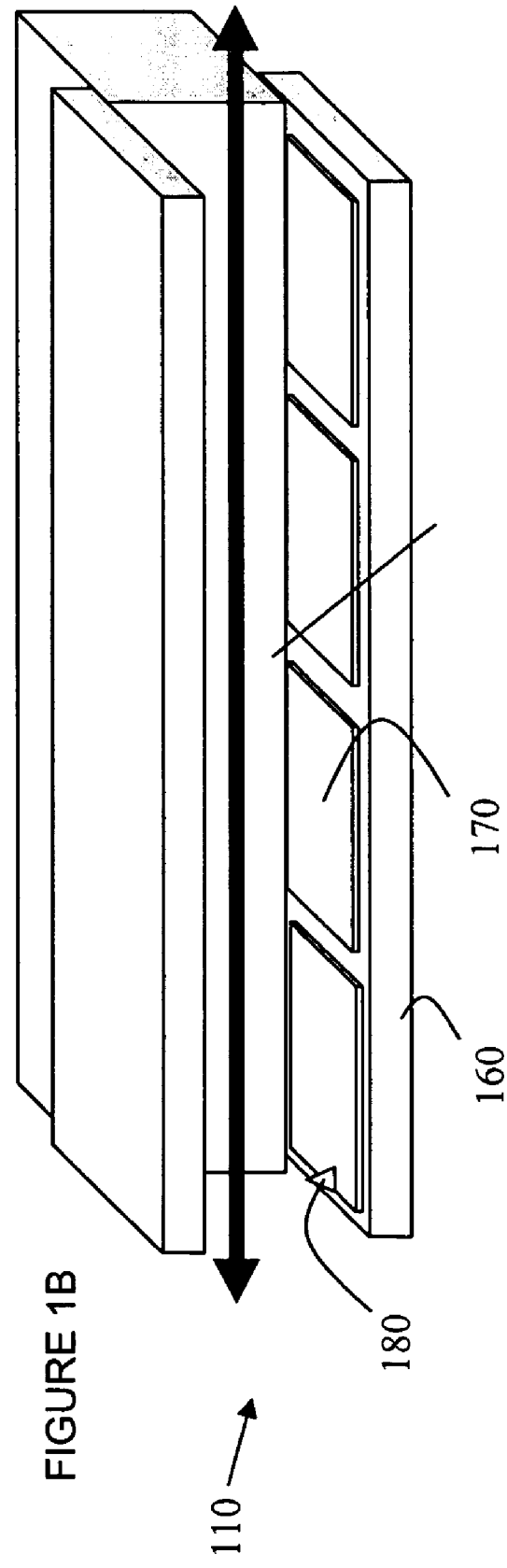

MULTI-PATH LASER SYSTEM

CROSS-REFERENCE RELATED APPLICATIONS

This application claims priority to provisional patents: application 60/535,549, filed 12 Jan. 2004, incorporated by reference in it's entirety; application 60/541,912, filed 6 Feb. 2004, incorporated by reference in it's entirety; application 60/544,198, filed 13 Feb. 2004, incorporated by reference in it's entirety; and application 60/605,157, filed 30 Aug. 2004, incorporated by reference in it's entirety.

FIELD OF THE INVENTION

The invention relates in general to lasers and particularly but not exclusively to RF excited waveguide lasers.

BACKGROUND OF THE INVENTION

Problems exist in scaling low power RF-excited gas discharge lasers up to higher powers. The RF power distribution tends to become uneven over the discharge area and can concentrate in one spot, thereby disrupting what would otherwise have been a uniformly excited discharge suitable for efficient laser power extraction. Increasing power is achieved by increasing the gas gain volume that further requires increasing the volume of the laser discharge region. Because increasing discharge length also increases the discharge volume, and because low power RF-excited gas discharge lasers do not typically change in cross-section significantly, it is therefore convenient to speak of power scaling in terms of length scaling. Every one (1) cm increase in laser discharge length will result in an increase of laser output power of approximately 0.5 Watts. Some disadvantages of length scaling are a corresponding increase in the size of the laser, and an increase in the frequency of discharge instabilities and further risk of exceeding the intensity damage threshold of the laser mirrors.

Additionally many RF excited lasers form a sheath on the surface of the electrodes, both on the positive and ground electrodes. The sheath has a thickness that is significant enough to disturb or perturb the mode of the laser in the axis of the sheath. The mode disturbance or perturbation can result in oval beam outputs that are undesirable when trying to focus with a circular lens.

SUMMARY OF THE INVENTION

Exemplary embodiments provide lasers that use multi-path (multi-fold) discharge chambers.

Exemplary embodiments provide lasers that use RF drive power inversion to improve mode quality.

At least one exemplary embodiment provides a multi-path waveguide laser chamber comprising: a first discharge chamber, the first discharge chamber including at least a first top electrode and a first bottom electrode; and a second discharge chamber, the second discharge chamber including at least a second top electrode and a second bottom electrode, where the first and second discharge chambers are aligned in a substantially parallel and nonlinear fashion, where at least two mirrors, a first mirror and a second mirror, are positioned to optically operatively connect the first and second discharge chambers.

At least one exemplary embodiment provides a laser chamber comprising: a first discharge chamber, where the first discharge chamber includes a first electrode and a second electrode; a second discharge chamber, where the second discharge chamber includes a third electrode and a fourth electrode; and at least one optical element, where the at least one optical element changes a beam's characteristics leaving the first discharge region before the beam enters the second discharge region. Where a further exemplary embodiment provides at least one optical element that rotates the beam's cross-section. In yet another exemplary embodiment the first and second discharge chambers are aligned in a linear fashion.

At least one exemplary embodiment provides a waveguide laser chamber comprising: a first discharge chamber, where the first discharge chamber includes a first electrode and a second electrode; and a second discharge chamber, where the second discharge chamber includes a third electrode and a fourth electrode, where a first plane passing substantially parallel through the first electrode makes an angle with a second plane passing substantially parallel through the third electrode.

At least one exemplary embodiment provides a method of RF inversion comprising: generating a first light in a first discharge chamber, where the first light leaves the first discharge chamber with a first cross-sectional orientation; coupling optically the first discharge chamber to a second discharge chamber, where the first light passes to the second discharge chamber; and rotating the first cross-sectional orientation into a second cross-sectional orientation prior to the first light entering a second discharge chamber.

Further areas of applicability of embodiments of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

Embodiments of the present invention will become apparent from the following detailed description, taken in conjunction with the drawings in which:

FIG. 1A illustrates a portion of a discharge chamber in accordance with at least one exemplary embodiment;

FIG. 1B illustrates a portion of a discharge chamber with electrode segmentation and discharge initiation protrusions in accordance with at least one exemplary embodiment;

DETAILED DESCRIPTION OF EXEMPLARY EMBODIMENTS OF THE PRESENT INVENTION

Figure 2:
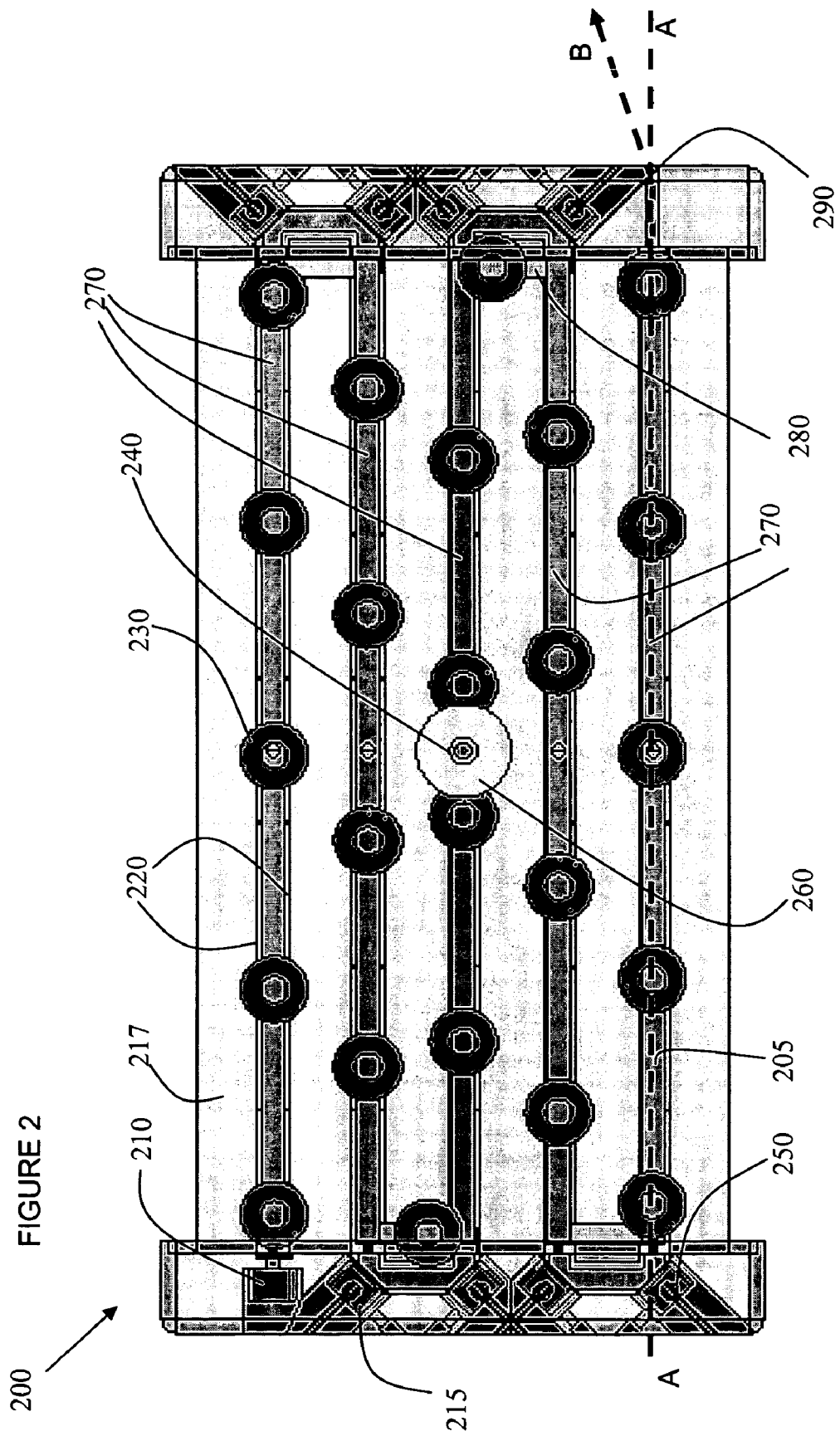
FIG. 2 illustrates a top view of a multi-path laser chamber, in accordance with at least one exemplary embodiment.

The following description of exemplary embodiment(s) is merely illustrative in nature and is in no way intended to limit the invention, its application, or uses.

Although the discussion herein may not discuss all details associated with multi-path and RF inversion laser systems, such details, as known by one of ordinary skill, are intended to be included within the scope of embodiments discussed herein.

Exemplary embodiments described herein are applicable for various laser systems with discharge regions, for example RF Excited Waveguide Gas (RFEWG) lasers, continuous wave or pulsed lasers, and other systems with discharge regions as known by one of ordinary skill.

FIG. 1A illustrates at least a portion of a discharge chamber 100 in accordance with at least one exemplary embodiment. The discharge chamber 100 includes an upper electrode 130, a lower electrode 140, and optionally sidewalls 120. A lasing medium can lie between the electrodes 130 and 140, where a voltage difference driven between electrodes 130 and 140 generates a gas discharge along the long axis 150. In at least one further exemplary embodiment, electrode segmentation can be used to provide discharge segmentation as described provisional application 60/605,157, filed 30 Aug. 2004, which has been incorporated in its entirety by reference.

FIG. 1B illustrates a portion of a discharge chamber 110 with electrode segmentation and discharge initiation protrusions in accordance with at least one exemplary embodiment. The discharge chamber 110, can include protrusions 180 that aid in discharge initiation by locally increasing the electric field. The discharge chamber 110 can also include segmented electrodes 170 on layer 160. Where the layer 160 can be composed of various insulative materials. Further exemplary embodiments can have protrusions and/or electrode segmentation.

To increase power without generally increasing laser size one can use multiple (at least two) discharge chambers. It is convenient to build multiple discharge sections that are optically connected. Using one mirror to interconnect multiple sections does not allow enough degrees of freedom to tilt and translate the beam from one discharge section to another. In exemplary embodiment two or more mirrors can be used to transfer the beam between discharge sections without altering the beam shape.

FIG. 2 illustrates a section view from the top of a multi-path (multi-discharge chamber) laser 200, in accordance with at least one exemplary embodiment. The exit discharge chamber 205 (under top electrode 270 at the exit) has a long axis A-A. The laser beam B exits the multi-path laser chamber 200 at an angle with respect to the long axis A-A, which can be zero. The embodiment shown has insulative sidewalls 220. The sidewalls 220, a top electrode (e.g. 270), and bottom electrodes 217 form one discharge chamber. The multi-path laser chamber 200 shown has five discharge chambers, of which the top electrode 270 is visible, arranged parallel and nonlinearly. The gas discharge generated in each discharge chamber can be optically coupled to the other discharge chambers. Optical coupling (e.g. via optical elements 210, 215, and 250) allow the light generated in a discharge chamber to have a longer discharge path length, equal to the addition of all of the discharge chamber long axes, increasing the power of the overall laser. Although five discharge chambers are shown in FIG. 2, exemplary embodiments are not limited to any number of discharge chambers, there could be fewer than five or more than five discharge chambers.

The electrodes are voltage driven by a power supply (e.g. Henry Radio model # SS750HF or other power supplies that provide power variation at frequencies as known by one of ordinary skill), along electrode feed cables (not shown), which are fed into the power inlet hole 240 in the insulating ring 260. In some exemplary embodiments the electrodes 270 are electrically connected via bridge 280. Additionally the electrodes 270 can be operatively connected to a grounded housing (not shown) via shunt inductors and conductive springs 230. The power supply chosen or made will depend upon the lasing medium (e.g. gas) and operating conditions, which can vary depending upon desired use.

The multi-path laser chamber 200 can include an end optical element 210 (e.g. mirror) at one end of the multi-path laser chamber 200 to reflect the light generated in discharge chambers back through the discharge chambers to an exit 290. The final optical element 250 directs the light through the final discharge chamber 205 to exit 290. The entire multi-path laser chamber can also be environmentally isolated (e.g. at a pressure other than atmospheric).

Although five discharge chambers are shown in FIG. 2, exemplary embodiments are not limited to any particular number of discharge chambers. Additionally, although the orientation of the discharge chambers shown is substantially parallel, any orientation of the discharge chambers is possible within the scope of exemplary embodiments provided they are optically coupled. Thus, the discharge chambers can be oriented in a planar or non-planar fashion.

Figure 3:
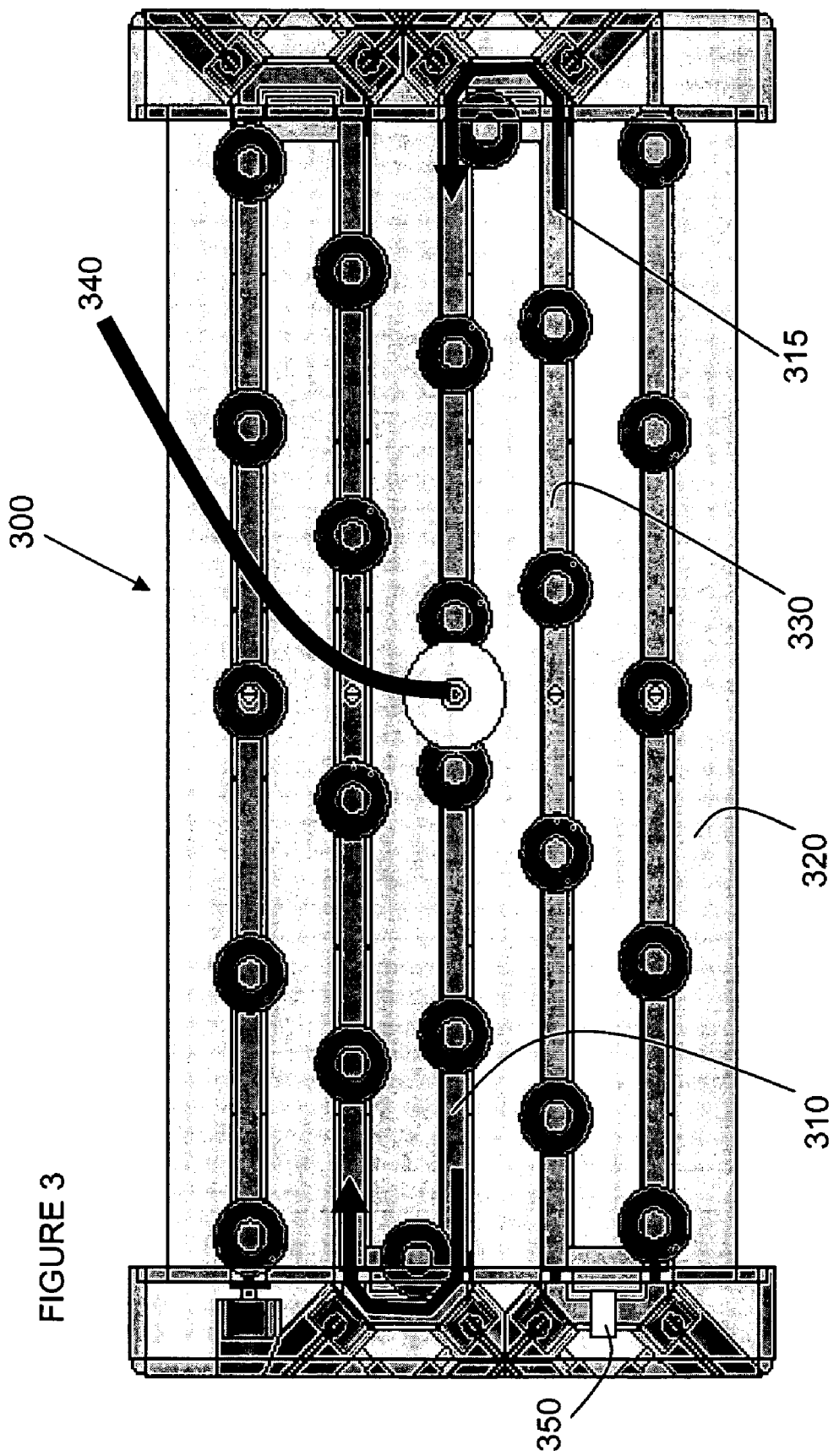
FIG. 3 illustrates a multi-path laser chamber including a single cable electrode feed in accordance with at least one exemplary embodiment.

FIG. 3 illustrates a multi-path laser chamber 300 including a single cable electrode feed 340 in accordance with at least one exemplary embodiment. The single cable electrode feed 340 electrically connects with top electrode 310. A power source drives a voltage variation between the top electrode 310 and an associated bottom electrode 320. Since all the top electrodes in this particular exemplary embodiment are electrically connected, shunt inductors, as discussed above, are used to avoid standing waves in the top electrodes, which would degrade discharge uniformity. The discharge chamber associated with top electrode 330 is optically connected 315 to the discharge chamber associated with top electrode 310, via optical elements, as discussed above. Although top electrodes are discussed above, the same would hold for the bottom.

RF excited lasers form a sheath on the surface of the electrodes, both the positive and ground electrodes being excited. The sheath has a thickness that is significant enough to disturb or perturb the mode of the laser in the axis of the sheath. In one embodiment of the present invention, whether in a two or multiple path laser, the electrodes (and/or the excitation of the electrodes) can be rotated or flipped so that the sheath is rotated, and the mode disturbance is averaged in each axis. In a square bore (cross-section) system with an even number of passes, eg. 2, 4, 6, etc., the varying voltage is rotated at various angles (e.g. 90, 270 degrees) in the even numbered passes. In a circular bore system it can be more mechanically convenient to rotate the RF excitation, for example the RF excitation can be rotated angles other than 90 or 270. For example, in a three pass circular bore system the RF excitation electrodes can be be mounted at angles with 120 degrees rotation, or in a eight pass circular bore system the RF excitation electrodes can be mounted at angles with 45 degrees rotation. Although the examples provided discussed specific angular values, exemplary embodiments are not limited to the angular values specified, likewise exemplary embodiments are not limited to the number of passes (e.g. an odd or even number).

Figure 4:
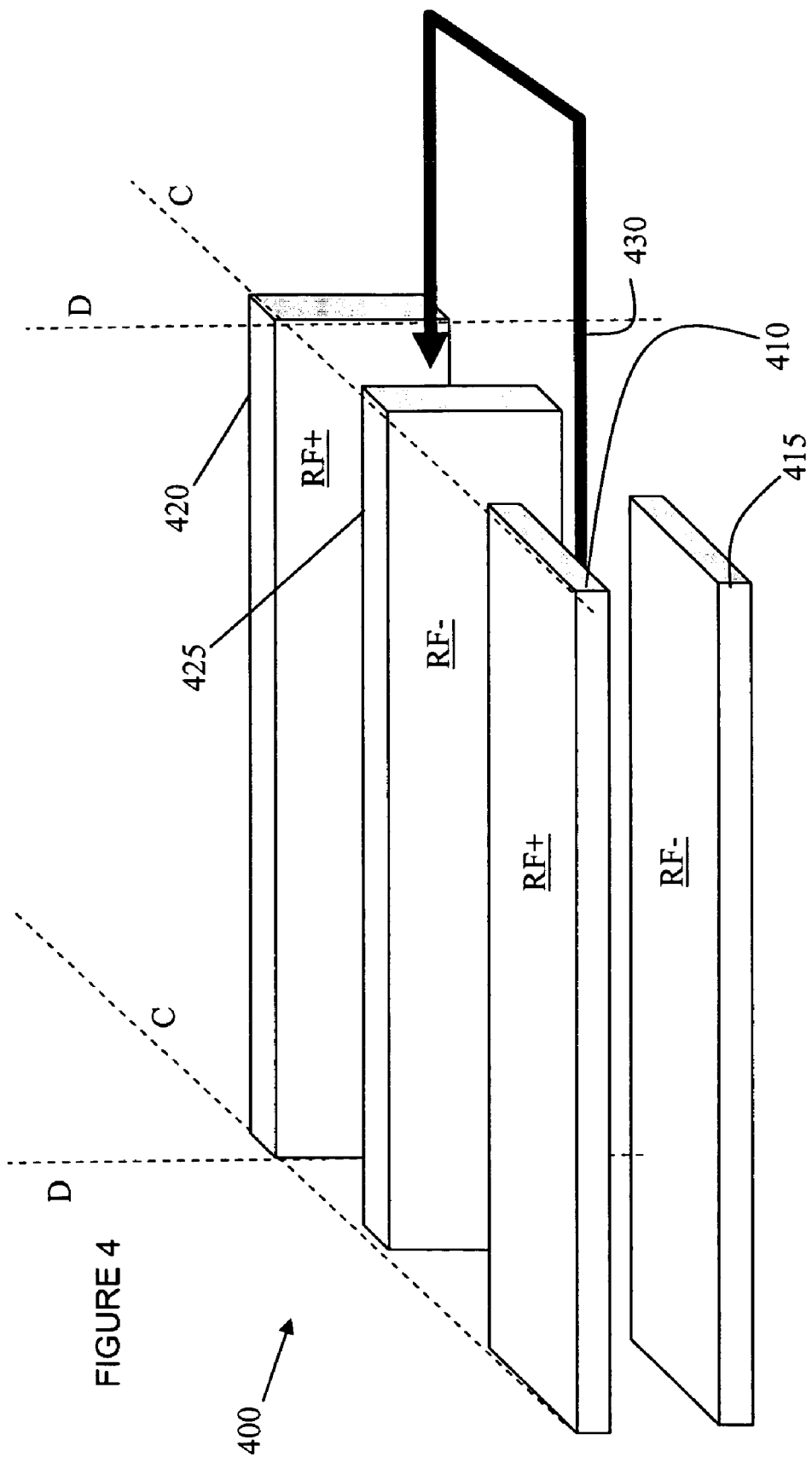
FIG. 4 illustrates non-linear substantially parallel discharge chambers oriented in accordance with at least one exemplary embodiment of RF inversion.

The RF drive power can be rotated (RF inversion) by rotating the angular RF position (e.g. rotating RF+ orientation from the first discharge chamber to the second discharge chamber of FIG. 4). This can be achieved by rotating the beam cross-section orientation between discharge chambers or by rotating the RF, for example rotating the RF electrodes relative to the discharge chamber, as discussed above. The angular RF position can be any value. An example of RF inversion in accordance with at least one exemplary embodiment can be to flip the electrodes. Flipping the electrodes would entail rotating the whole discharge structure discussed in FIG. 2 so that the top electrode 270 and bottom electrode 217 become the sidewalls and the sidewalls 220 become the top and bottom electrodes.

FIG. 4 illustrates discharge chambers 400 oriented in accordance with at least one exemplary embodiment of RF inversion where the electrodes are flipped an angle compared to the orientation of the electrodes in neighboring discharge chambers. A first discharge chamber includes top electrode 410 and bottom electrode 415 and a second discharge chamber includes top electrode 420 and bottom electrode 425, where the first and second discharge chambers have long-axes that are arranged in a substantially nonlinear parallel fashion. Light from the first discharge chamber can be optically connected 430 to the second discharge chamber as discussed above. A first plane (defined by the edges C) passing through the first top electrode 410 can make an angle with a second plane (defined by the edges D) passing through the second top electrode 420. The angle shown in FIG. 4 is 90 degrees, although as discussed above, the angle in exemplary embodiments can be any value, even zero. Thus, the sheath, which forms parallel to the electrode surface flips. Additionally in at least one exemplary embodiment rotated electrodes or optical elements to rotate the beam are used with discharge chambers that are aligned in a substantially linear fashion rather than a nonlinear multi-path manner.

In yet at least one further exemplary embodiment of RF inversion the cross section of the beam leaving one discharge chamber can be rotated using an optical element instead of, or in addition to an electrode rotation or RF rotation. For example in FIG. 3 an additional optical element 350 (e.g. mirror, refractive element, or other beam modifying optical element as known by one of ordinary skill) could be added that flips the beam so that the beam flips an angle (e.g. 90 degrees) as it passes from one square bore discharge section to another. Although different types of bore's are discussed (square and round) exemplary embodiments are not limited to any type or shape of the cross-section of the discharge chambers.

Figure 5:
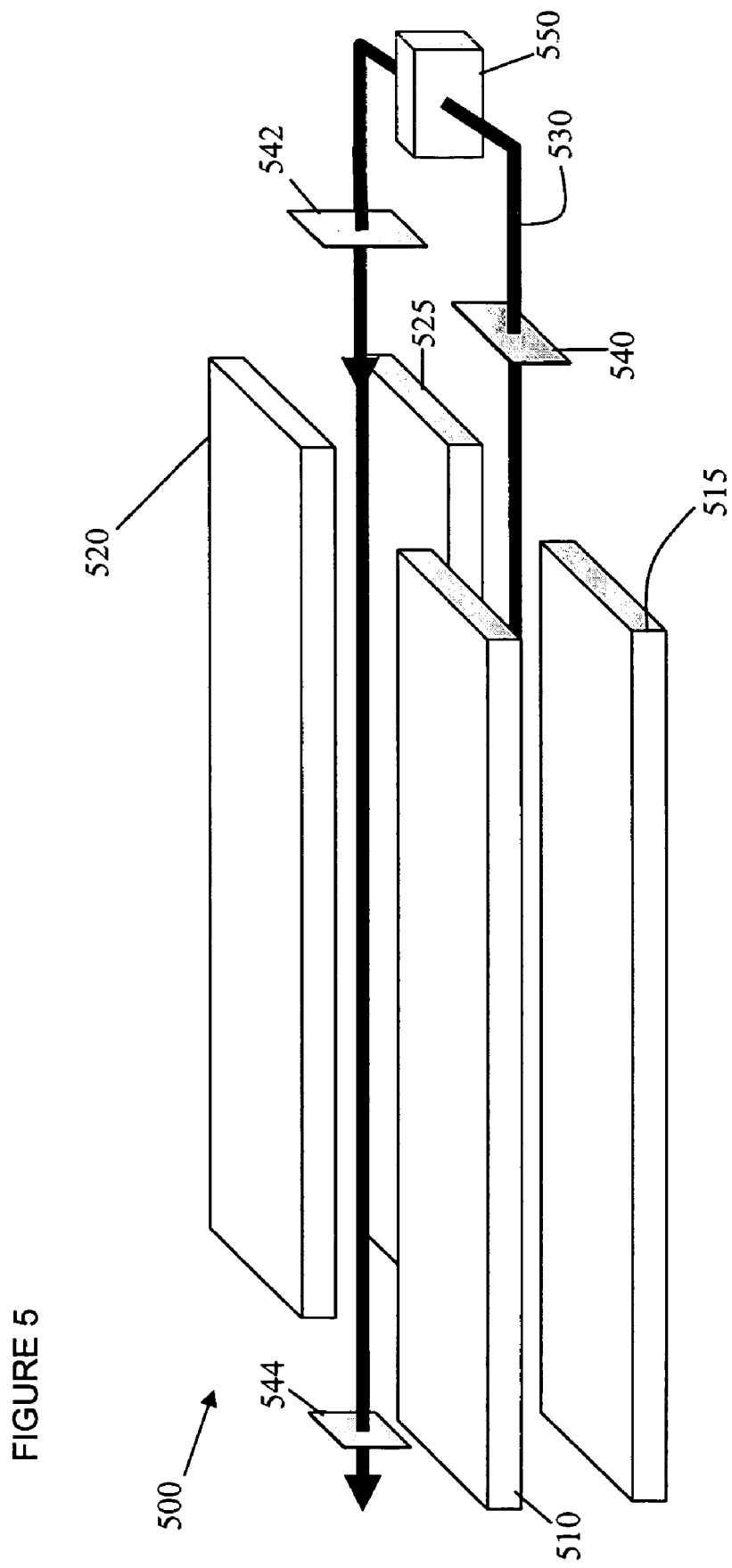
FIG. 5 illustrates similar discharge chambers and at least one optical element in accordance with at least one exemplary embodiment of RF inversion.

FIG. 5 illustrates discharge chambers 500 in accordance with yet at least one further exemplary embodiment of RF inversion. A first and second discharge chamber can be oriented in a non-linear manner, including a first top electrode 510 and a first bottom electrode 515 in the first discharge chamber, and a second top electrode 520 and a second bottom electrode 525 in the second discharge chamber. The beam leaving the first discharge chamber 530 has a cross-section 540 that is rectangular, but can be any shape (e.g. approximately oval, as opposed to square or round), due to the sheaths of top 510 and bottom 515 electrodes. An optical element 550 (e.g. refractive element(s), an array of mirrors, waveguide(s), and other optical element(s) as known by one of ordinary skill to rotate the beam) can be used to rotate the beam into a different cross-section 542 orientation prior to entrance of the second discharge chamber. The sheaths of the top 520 and bottom 525 electrodes of the second discharge chamber alter the cross-section as did the first discharge chamber, such that a cross-section of the beam leaving the second discharge chamber 544 is more akin to a desired cross-sectional shape (e.g. square, circular, or any other desired shape).

As discussed, there are several methods of RF inversion that can be used in accordance with exemplary embodiments. In summary the two methods discussed include a method of RF inversion comprising: generating a first light in a first discharge chamber, where the first discharge chamber has a first orientation of a first electrode pair; generating a second light in a second discharge chamber, wherein the second discharge chamber has a second orientation of a second electrode pair; rotating the orientation of the first electrode pair with respect to the second electrode pair; and coupling optically the first discharge chamber to the second discharge chamber, wherein the first light passes to the second discharge chamber.

The second example discussed is a method of RF inversion comprising: generating a first light in a first discharge chamber, where the first light leaves the first discharge chamber with a first cross-sectional orientation; coupling optically the first discharge chamber to a second discharge chamber, where the first light passes to the second discharge chamber; and rotating the first cross-sectional orientation into a second cross-sectional orientation prior to the first light entering a second discharge chamber.

Other methods besides the two discussed here, that one of ordinary skill would know fall within the discussion herein, are intended to be within the scope of exemplary embodiments.

As discussed above exemplary embodiments can be used for all lasers. Waveguide lasers are defined by the gap between the electrodes that guides the mode of the laser. As the gap between the electrodes is opened up the laser is still RF driven but the waveguides do not guide the mode any more, so it is not a "waveguide" laser. A laser's Fresnel number defines a waveguide laser with any laser having a Fresnel number <<1 defined as a waveguide laser. Exemplary embodiments can be used with lasers with all possible associated Fresnel numbers.

The description of the invention is merely exemplary in nature and, thus, variations that do not depart from the gist of the invention are intended to be within the scope of the embodiments of the present invention. Such variations are not to be regarded as a departure from the spirit and scope of the present.

What is claimed is:

1. A multi-path waveguide laser chamber comprising:
   a first discharge chamber;
   a second discharge chamber, each of the first discharge chamber and the second discharge chamber including at least a top electrode and a bottom electrode, where the first and second discharge chambers are aligned in a nonlinear fashion, wherein there are at least two mirrors disposed in an optical path between the first chamber and the second chamber, comprising:
   a first mirror; and
   a second mirror, wherein the first mirror and the second mirror are positioned to optically operatively connect the first and second discharge chambers, wherein the first and second mirrors are not parallel to each other and are spaced apart from each other, and
   at least one optical element, wherein the at least one optical element rotates, independently of the first and second mirrors, the cross-section of a beam into a different cross-section orientation leaving the first discharge chamber prior to entering the second discharge chamber.

2. The waveguide laser chamber of claim 1 wherein the first chamber and the second chamber respectively comprise a first upper electrode and a second upper electrode that are electrically connected.

3. The waveguide laser chamber of claim 2, wherein the first and second discharge chambers are positioned so that a first plane passing through the first upper electrode intersects at an angle a second plane passing through the second upper electrode, where an angular RF orientation rotates from the first discharge chamber to the second discharge chamber.

4. The waveguide laser chamber of claim 1, further comprising:
   a planar mirror, wherein the planar mirror is placed to reflect light leaving one end of one of the first discharge chamber reflecting at least a portion of the light back into the first discharge chamber.

5. The waveguide laser chamber of claim 1, further comprising:
   a third mirror, wherein the third mirror directs light from the first discharge chamber into the second discharge chamber.

6. The waveguide laser chamber of claim 3, wherein the angle is substantially 90 degrees.

7. The waveguide laser chamber of claim 5, wherein the light directed from the third mirror passes through the second discharge chamber and exits the laser chamber forming a laser beam.

8. A waveguide laser chamber comprising:
   a first discharge chamber, wherein the first discharge chamber includes a first electrode and a second electrode;
   a second discharge chamber separate from the first discharge chamber, wherein the second discharge chamber includes a third electrode and a fourth electrode, wherein a first plane passing substantially parallel through the first electrode makes a substantially non-zero angle with a second plane passing substantially parallel through the third electrode, where an angular RF orientation rotates from the first discharge chamber to the second discharge chamber, wherein the first electrode and the third electrode are similarly charged, and wherein the second electrode and the fourth electrode are similarly charged, and wherein the discharge are arranged in a parallel and nonlinear fashion;
   a first mirror;
   a second mirror, wherein the first mirror and the second mirror are positioned to optically operatively connect the first and second discharge chambers; and
   at least one optical element, wherein the at least one optical element rotates, independently of the first and second mirrors, the cross-section of a beam into a different cross-section orientation leaving the first discharge chamber prior to entering the second discharge chamber.

9. A laser chamber comprising:
   a first discharge chamber, wherein the first discharge chamber includes a first electrode and a second electrode;
   a second discharge chamber, wherein the second discharge chamber includes a third electrode and a fourth electrode, the third and fourth electrodes being different from the first and second electrodes;
   a first mirror
   a second mirror, wherein the first mirror and the second mirror are positioned to optically operatively connect the first and second discharge chambers; and
   at least one optical element, wherein the at least one optical element rotates, independently of the first and second mirrors, the cross-section of a beam into a different cross-section orientation leaving the first discharge chamber prior to entering the second discharge chamber.

10. The laser chamber of claim 9. wherein the first electrode has a protrusion.

11. The laser chamber of claim 9, wherein the first electrode is segmented.

12. The laser chamber of claim 1, wherein the first electrode has a protrusion.

13. The laser chamber of claim 1. wherein the first electrode is segmented.

14. The laser chamber of claim 1, wherein the at least one optical element rotates the cross-section of the beam 90°.

15. The waveguide laser chamber of claim 8, further comprising a first mirror and a second mirror disposed in an optical path between the first discharge chamber and the second discharge chamber, wherein the first mirror and the second mirror are positioned to optically operatively connect the first and second discharge chambers.

16. A multi-path waveguide laser chamber comprising:
   a first discharge chamber, wherein the first discharge chamber includes a first electrode and a second electrode;
   a second discharge chamber separate from the first discharge chamber, wherein the second discharge chamber includes a third electrode and a fourth electrode, wherein the discharge chambers are arranged in a parallel and nonlinear fashion;
   wherein a first plane passing substantially parallel through the first electrode makes a substantially non-zero angle with a second plane passing substantially parallel through the third electrode, where an angular RF orientation rotates from the first discharge chamber to the second discharge chamber, wherein the first electrode and the third electrode are similarly charged, and wherein the second electrode and the fourth electrode are similarly charged;
   a first mirror;
   a second mirror, wherein the first mirror and the second mirror are positioned in an optical path between the first chamber and the second chamber to optically operatively connect the first and second discharge chambers; and
   at least one optical element, wherein the at least one optical element rotates, independently of the first and second mirrors, the cross-section of a beam into a different cross-section orientation leaving the first discharge chamber prior to entering the second discharge chamber.

17. The laser chamber of claim 16, wherein the at least one optical element rotates the cross-section of the beam 90°.

18. The laser chamber of claim 13, wherein the at least one optical element rotates the cross-section of the beam 90°.

* * * * *